US009278593B1

(12) United States Patent
Piacsek

(10) Patent No.: US 9,278,593 B1
(45) Date of Patent: Mar. 8, 2016

(54) ARTICULATING VEHICLE BELLOWS

(71) Applicant: Dynatect Manufacturing, Inc., New Berlin, WI (US)

(72) Inventor: Steven Piacsek, Waukesha, WI (US)

(73) Assignee: Dynatect Manufacturing, Inc., New Berlin, WI (US)

(\*) Notice: Subject to any disclaimer, the term of this patent is extended or adjusted under 35 U.S.C. 154(b) by 22 days.

(21) Appl. No.: 14/453,484

(22) Filed: Aug. 6, 2014

Related U.S. Application Data

(60) Provisional application No. 61/862,887, filed on Aug. 6, 2013.

(51) Int. Cl.
*B60D 5/00* (2006.01)
*B61D 17/22* (2006.01)

(52) U.S. Cl.
CPC *B60D 5/003* (2013.01); *B60D 5/00* (2013.01); *B61D 17/22* (2013.01)

(58) Field of Classification Search
CPC .................................. B60D 5/00; B61D 17/22

USPC .......................................................... 280/403
See application file for complete search history.

(56) References Cited

U.S. PATENT DOCUMENTS

| 5,953,998 | A | * | 9/1999 | Petit | B61D 17/22 105/18 |
| 6,054,194 | A | * | 4/2000 | Kane | B60D 5/003 105/18 |
| 2005/0183622 | A1 | * | 8/2005 | Petit | B61D 17/22 105/8.1 |
| 2007/0175355 | A1 | * | 8/2007 | Mosaner | B61D 17/22 105/18 |
| 2009/0193999 | A1 | * | 8/2009 | Gomis | B61D 17/22 105/18 |
| 2010/0025962 | A1 | * | 2/2010 | Tabellini | B61D 17/22 280/403 |
| 2014/0291938 | A1 | * | 10/2014 | Koukal | B60D 5/006 277/345 |

\* cited by examiner

*Primary Examiner* — Tony Winner
(74) *Attorney, Agent, or Firm* — Andrew C. Landsman; Godfrey & Kahn, S.C.

(57) ABSTRACT

A bellows for an articulating vehicle has improved performance by using fewer discrete pieces of flexible material, and a multi-piece frame. By using fewer pieces of flexible material, less stitching is required, which results in improved performance and ease of manufacture.

10 Claims, 18 Drawing Sheets

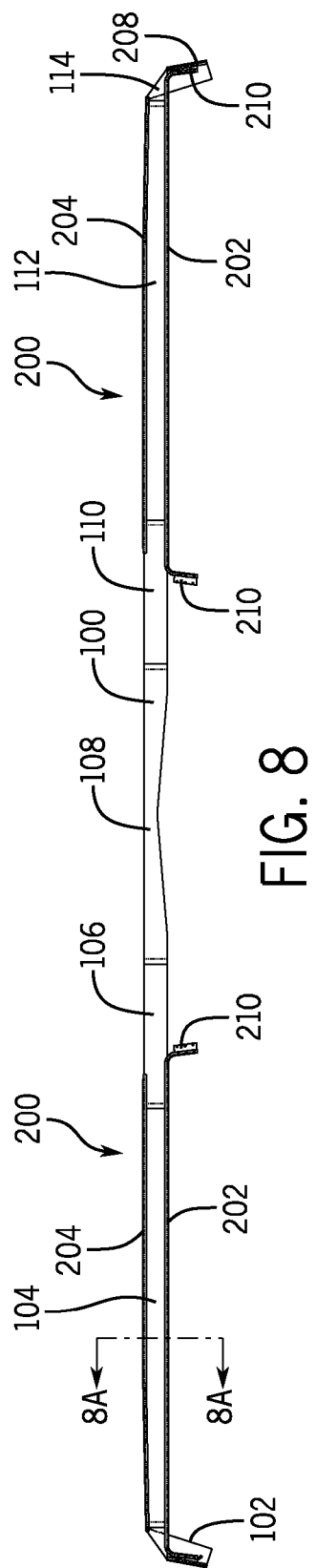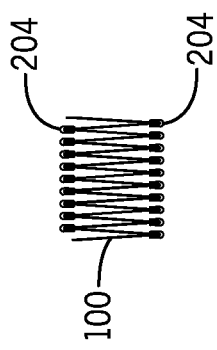

ARTICULATING VEHICLE BELLOWS

CROSS-REFERENCE TO RELATED APPLICATION

This application is based on and claims priority to U.S. Provisional Patent Application No. 61/862,887 filed on Aug. 6, 2013, which is incorporated herein by reference in its entirety for all purposes.

FIELD OF THE INVENTION

The present invention relates generally to the field of protective coverings which extend and retract. More particularly, the present invention relates to a bellows which can be used on an articulating vehicle such as, but not limited to, an articulating bus.

BACKGROUND

Large bellows that are used to protect a moveable connection such as on an articulating vehicle typically have a pleated type construction manufactured from many pieces of coated fabric that are sewn together and supported by perimeter frames. In some constructions the perimeter frames may be located at the outer perimeter of the fabric pleats. In other constructions, the perimeter frames may be located along the inner perimeter of the fabric pleats. In constructions where the frames are located at the outer perimeter, the fabric pleats are typically made of separate fabric pieces that are stitched together to form the folds of the pleat, resulting in a "V" shaped cross-section, referred to as a folding construction. In another construction having the frames located at the outer perimeter, the fabric is allowed to remain as a flat piece, which results in a "U" shaped cross-section. This alternate method of construction is often referred to as a corrugated construction. Due to the "U" shape of these bellows, separate fabric pieces are used to create the pleated shape. Like the previously described construction, the fabric pieces are joined together on the edges by the perimeter frames or by stitching.

Assembly of typical articulating vehicle bellows is a labor intensive process that requires the handling of numerous individual fabric panels, alignment of inner and outer edges of each of the fabric panels, and then stitching the panels together or crimping the aluminum support frames to the fabric panels to create the final configuration. As shown in FIGS. 1-3, typical folding type bus bellows 10 require fourteen individual panels per section, with ten sections, or 140 individual panels per assembled bellows. Typical corrugated bellows will require seventeen individual panels per section, with ten sections, or 170 individual panels per assembled bellows.

Additionally, as shown in FIG. 3, perimeter frames 20 used in typical articulating vehicle bellows 10 must be very large because they are formed to the entire perimeter shape. Such large perimeter frames 20 require that the bellows 10 be assembled one folding, or corrugated section, at a time with each section having a perimeter frame 20 and a fabric section 22 made from the many individual panels.

An additional drawback to traditional articulating vehicle bellows is that a significant amount of stitching is required to join the individual fabric pieces together as well as to join the assembled fabric pieces to one another in creating individual folding sections. A typical bellows having the multitude of fabric panels described above requires over 2,500 inches of stitching to create the folding sections. Every inch of the stitching also requires manual sealing in order to prevent liquid or air from penetrating the seams. The sealing of the seams is commonly accomplished by using an adhesive or caulk type sealer, and is typically a manual process.

As shown in FIGS. 1B and 1C, typical folding bellows 10 also require that the corner fabric pieces 24, 26 be individual panels with rounded shaped corners to transition from a horizontal side to a vertical side. The individual corner fabric pieces 24, 26 which are used to create the radius corner result in a large amount of material scrap due to their shape and inability to be nested closely in a CNC fabric cutting program. Additionally, the radius corners are subject to a large amount of stress because they must be tight enough to provide support to the bellows 10 in the standard mounted position and to prevent excessive sagging of the bellows, but also allow the folds to open enough so that the bellows can make a large extension when an articulating vehicle turns. This requires the corner pieces and corner stitching to be stretched tightly during the turn.

There have been efforts to use a folding corner in some cases to replace the rounded corners of the bus bellows. In one case, a tongue-in-groove type folding arrangement is used to transition the pleats from a horizontal side to a vertical side. This folding arrangement has drawbacks due to the significant flexing stress placed on the fabric material which leads to premature flex fatigue failure of the fabric which results in a hole in the fabric, and thus, an inability of the bellows to prevent air and liquid from intrusion into the area to be protected.

Another common folding arrangement has a chamfered or mitered corner. This folding arrangement allows the fabric material to roll, rather than crease which results in less flex fatigue placed on the fabric. Both of the folding arrangements previously described have been common to the manufacture of standard folding bellows for a very long time. Both folding arrangements can also allow for a larger opening of a corner than the rounded shaped corner allows for and thus make it possible to reduce the number of folds.

Accordingly, there is a need for a bellows design that allows for a less complex and expensive method of manufacture by using fewer fabric panels, less material, and requiring less, and easier, handling of the fabric and support frames. There is also a need for a bellows that does not require manual sealing of the stitching holes that are created in a typical folding type articulating vehicle bellows.

SUMMARY

The present invention is a bellows for an articulating vehicle having an assembled flexible material layout including a left bottom corner flexible portion, a left side flexible portion, a left top corner flexible portion, a top flexible portion, a right top corner flexible portion, a right side flexible portion, and a right bottom corner flexible portion. One end of the left bottom corner flexible portion is attached to a first end of the left side flexible portion, and a second end of the left side flexible portion is attached to a first end of the left top corner flexible portion. A second end of the left top corner flexible portion is attached to a first end of the top flexible portion, and a second end of the top flexible portion is attached to a first end of the right top corner flexible portion. A second end of the right top corner portion is attached to a first end of the right side flexible portion, and a second end of the right side flexible portion is attached to a first end of the right bottom corner flexible portion.

A plurality of external side support frames are attached to the right and left side flexible portions, and a plurality of internal side support frames are attached to the right and left side flexible portions. Each of the internal side support frames has a top and bottom connecting plate for connecting the internal side support frames to the external support frames. A plurality of top support frames are attached to the top flexible portion and further attached to the top connecting plates, and a plurality of bottom support frames are attached to the left bottom corner and right bottom corner flexible portions and further attached to the bottom connecting plates.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

BRIEF DESCRIPTION OF THE DRAWINGS

FIG. 8 is a schematic view of the bellows of FIG. 4 showing the flexible material pleated with internal side frames, external side frames, and external lower frames mounted in a pleated strip configuration;

FIG. 8A is a section view of the bellows of FIG. 7 taken generally along the line 8A-8A in FIG. 8;

DETAILED DESCRIPTION

Figure 5:
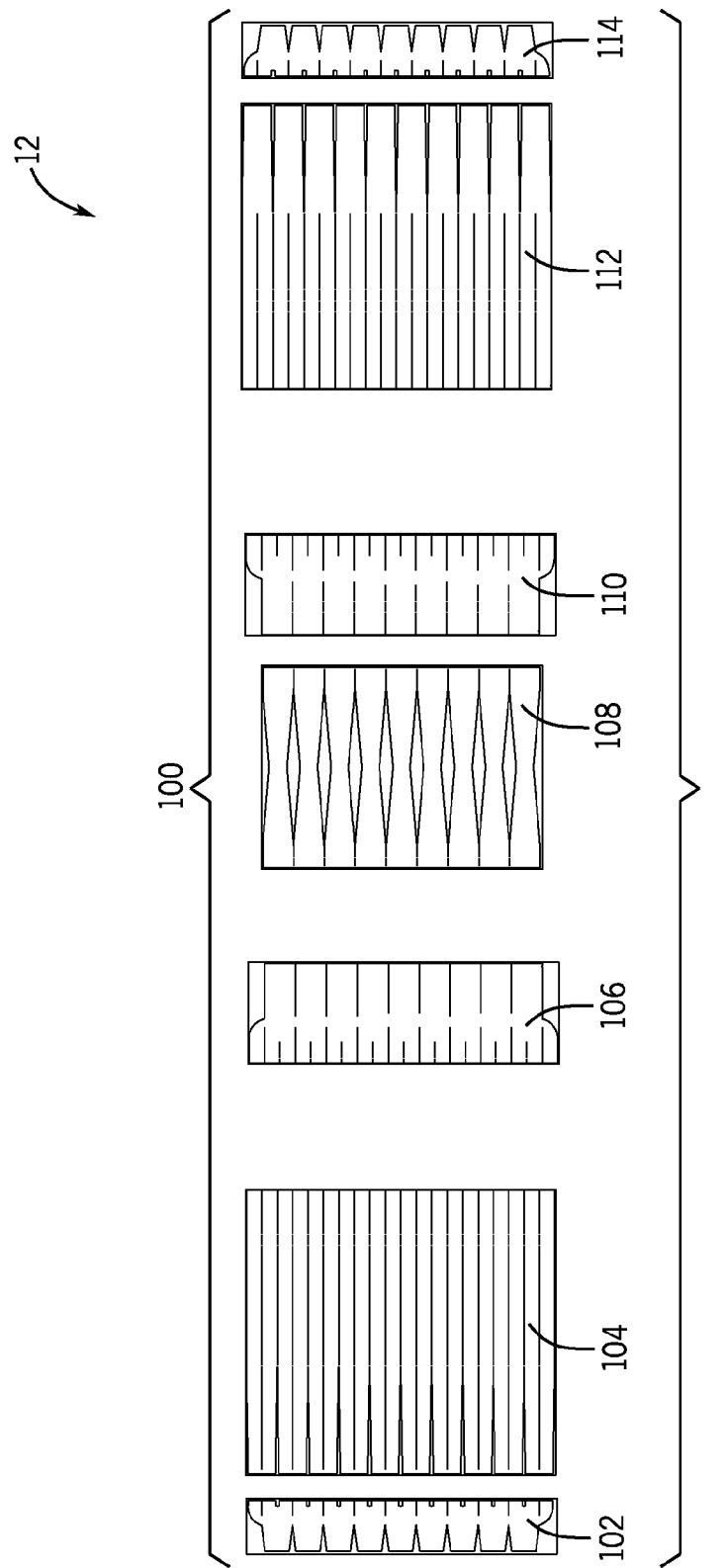
FIG. 5 is an exploded schematic view of the bellows in of FIG. 4, showing each of the flexible panels.
Figure 6:
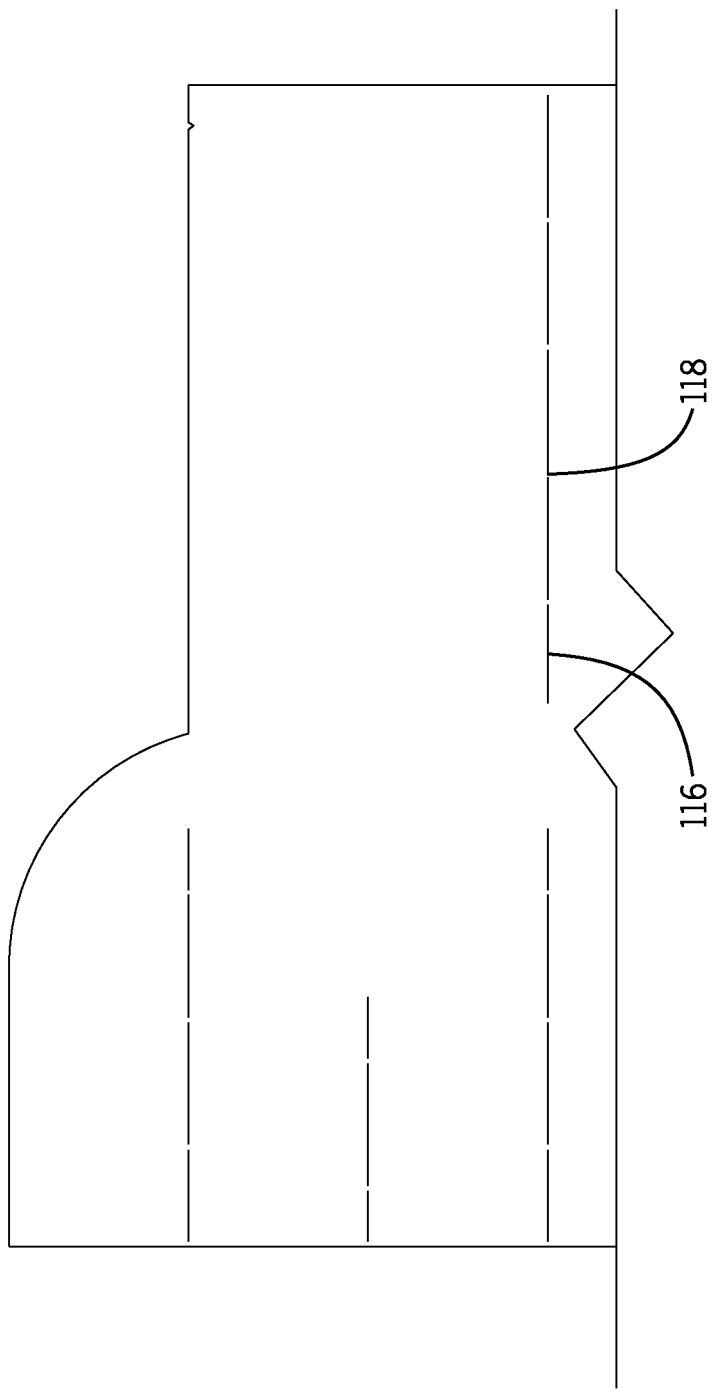
FIG. 6 is a schematic view of one embodiment of a slit and tab arrangement of a flexible piece in accordance with the invention.

A bellows 12 for an articulating vehicle in accordance with the invention has a reduced number of flexible pieces and support frames. In the embodiment shown in FIGS. 4-18, only seven flexible pieces 100 are required to form the entire bellows, compared to over one hundred pieces for a conventional articulating vehicle bellows described previously. Referring to FIG. 5, the flexible pieces 100 are left bottom corner 102, left side section 104, left top corner 106, top portion 108, right top corner 110, right side section 112, and right bottom corner 114. The flexible pieces 100 are typically made of a fabric substrate based material that has a coating of elastomer or thermoplastic. It is also possible to use a plastic sheet in some parts of the bellows 12 which are not subject to folding stresses, the sides for example. Of course, any other suitable material may alternatively be used for the flexible pieces 100 without departing from the invention. Additionally, the flexible pieces 100 need not all be made of the same material. The flexible pieces 100 are configured such that each can be a single piece, two pieces, or any other number as necessitated by the bulk size of the flexible material. The flexible pieces 100 are then cut with a series of slits and connecting tabs, as well as other necessary cutouts which, when folded, will produce the desired shape of the assembled bellows. The shapes and sizes of the slits, connecting tabs, and cutouts can be any shape and size depending on the desired size and shape of the finished bellows 12. A CNC programmed cutting machine may be used to cut the flexible pieces 100, but the patterns could also be hand marked and hand cut to achieve the same result. FIG. 5 shows a detailed view of the left top corner 106, which includes a plurality of slits 116 and connecting tabs 118 that combine to form the folds of the completed bellows 12.

In the embodiment shown, there are no slits to define the top folds. Rather, the flexible material is allowed to take on a rolled shape as in a corrugated bellows. This method of construction serves two purposes. First, there is no need for an inside top support frame and as such it would be desirable to not have any valley type seam as in a conventional bellows. The second purpose is to allow for ease of movement when the articulation area is extended as when a vehicle travels through a turn.

Figure 7:
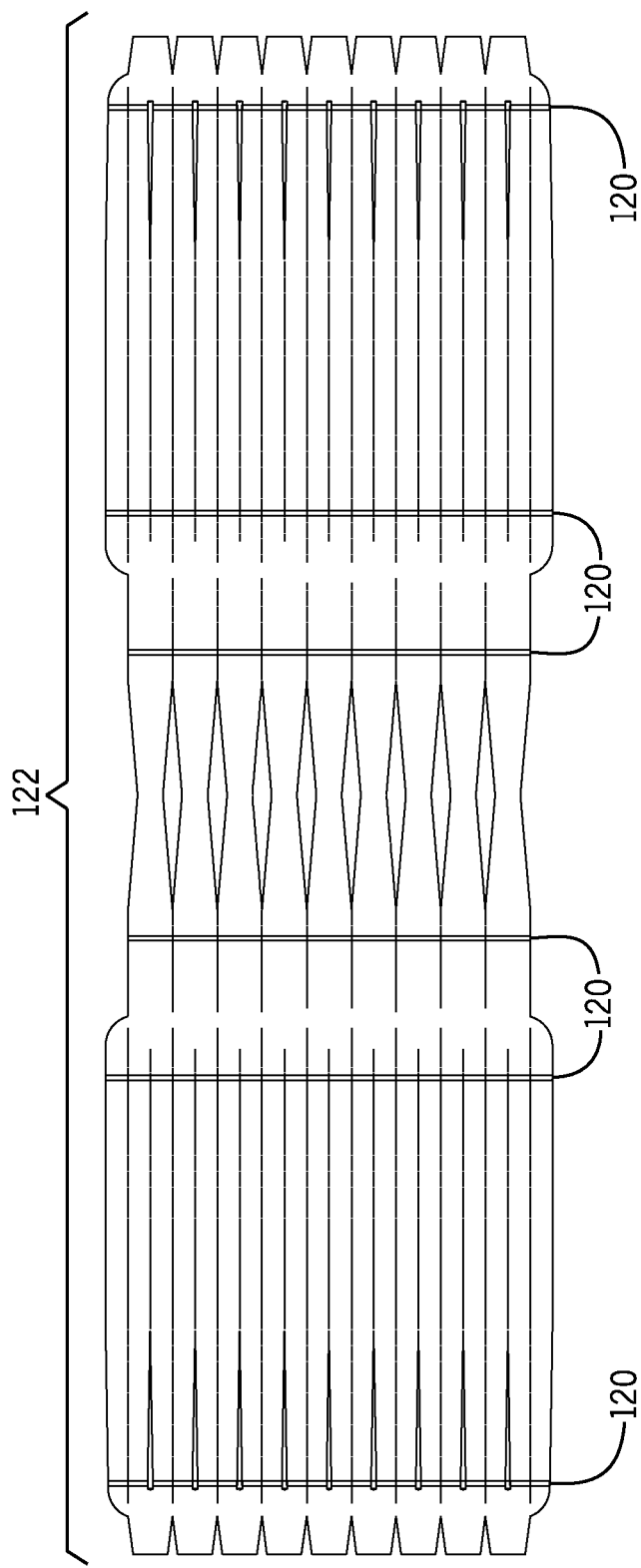
FIG. 7 is a schematic view of the bellows of FIG. 4, showing the flexible panels assembled together.

As shown in FIG. 7, once the required flexible pieces 100 have been cut to size and shape, they are assembled into an assembled flexible material layout 122 using overlapping type seams 120. In the embodiment shown, only six seams are needed to form the assembled flexible material layout 122 for the bellows 12. These seams 120 can be stitched, bonded, taped, or sealed to provide the proper connection required for the use of the bellows 12 on a transit bus, rail vehicle, or similar duty use. The resultant assembled flexible material layout 122 will be a large pattern with the slits 116, tabs 118 and cutouts located such that when folded into a pleated configuration and then formed into a circumferential shape, the assembled flexible material layout 122 will locate itself into the required dimensional locations. The slits 116 and tabs 118 that are cut into the flexible pieces 100 allow the assembled flexible material layout 122 to be folded in an accordion manner with alternating fold directions.

Figure 9:
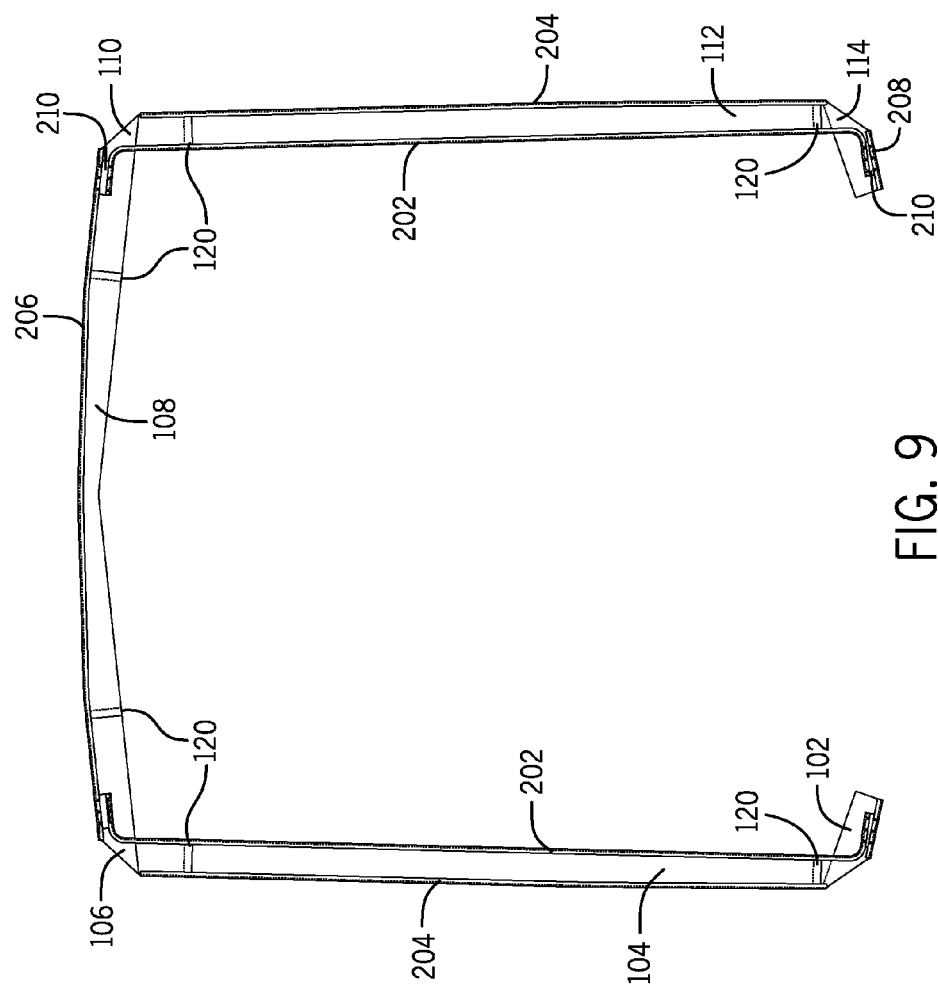
FIG. 9 is a front view of the bellows of FIG. 4 showing outer top frames joining the internal side frames together to form the bellows shape.

FIGS. 8-9 show the bellows 12 in a folded configuration with support frames 200 attached. As shown, there are side internal support frames 202 and side external support frames 204 that replace the stitching of traditional articulating vehicle bellows with a seamless, gutter shaped channel. Additionally, the support frames 202, 204 provide barriers that prevent liquid or gas penetration into or out of the bellows 12. It may also be desirable to use an adhesive, tape, or alternate material joining method prior to folding the fabric in an accordion manner to provide an additional barrier and also help maintain the folded accordion shape. Alternatively, staples or similar fastening methods may be used to hold the folded shape. In the embodiment shown, the support frames 202, 204 are made of aluminum, but any suitable material may be used without departing from the invention.

Figure 1A:
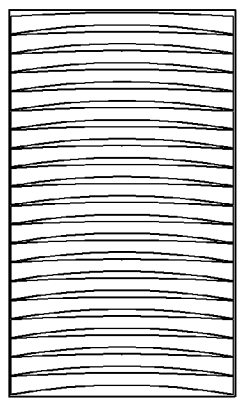
FIG. 1A is a schematic view of the material requirements for the top section of a typical prior art folding type bus bellows.
Figure 1B:
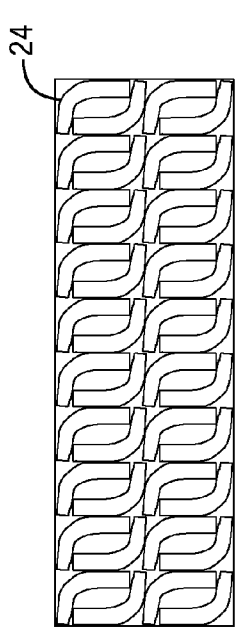
FIG. 1B is a schematic view of the material requirements for the top radius corners of a typical prior art folding type bus bellows.
Figure 1C:
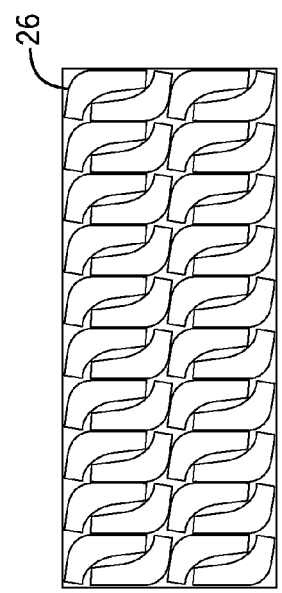
FIG. 1C is a schematic view of the material requirements for the bottom radius corners of a typical prior art folding type bus bellows.
Figure 1D:
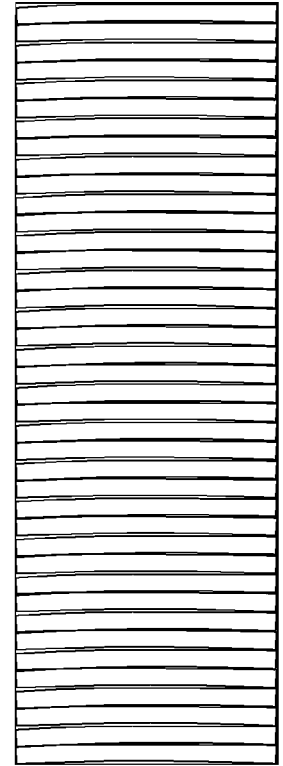
FIG. 1D is a schematic view of the material requirements for the side sections of a typical prior art folding type bus bellows.
Figure 2:
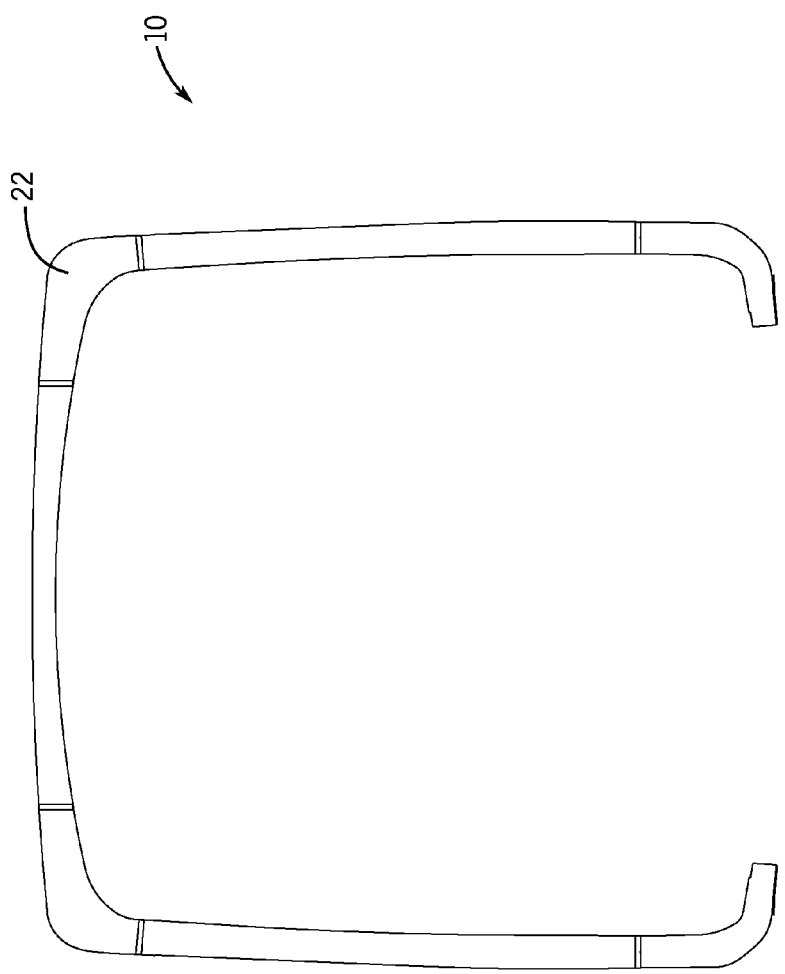
FIG. 2 is a schematic view of an assembled folding section for a typical prior art folding type bus bellows.
Figure 3:
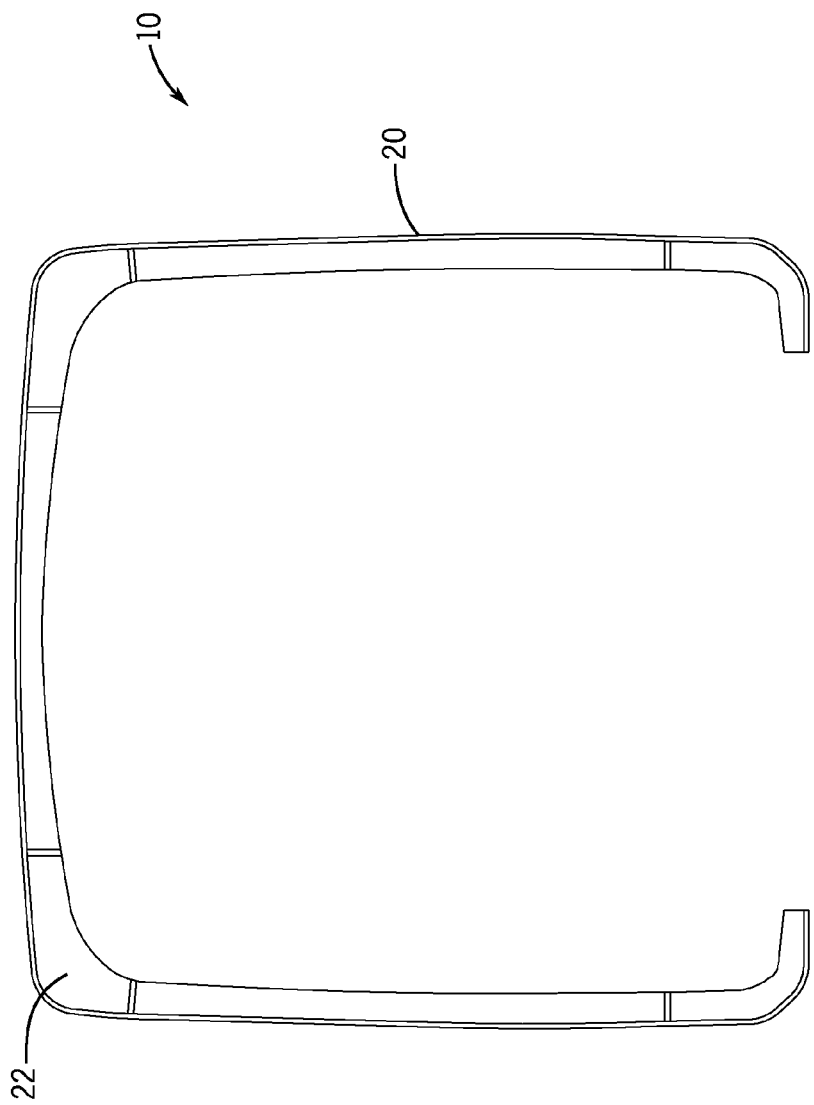
FIG. 3 is a schematic view of a support frame arrangement for a typical prior art folding type bus bellows.
Figure 4:
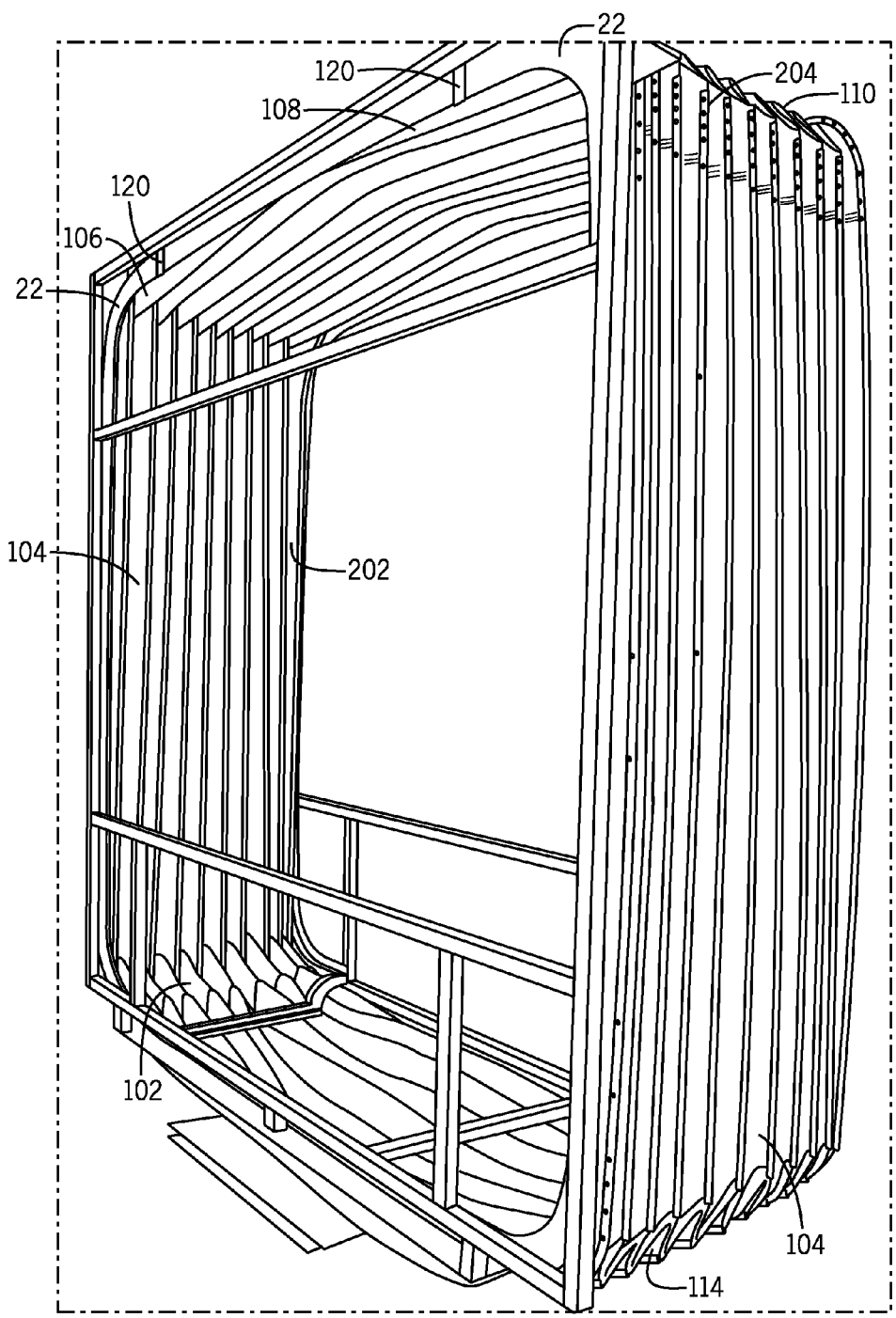
FIG. 4 is a perspective view of one embodiment of a bellows in accordance with the invention.

As shown in FIG. 9, the support frames 202, 204 are smaller and use less material than typical articulating vehicle bellows support frames (see FIG. 3). A plurality of side internal support frames 202 are used on each inside side surface of the bellows 12, a plurality of side external support frames 204 are used on an external side surface of the bellows, top external support frames 206 at the top of the bellows 12, and lower external frames 208 at the bottom of the bellows. Connecting plates 210 are mounted at each end of the side external support frames 202. The connecting plates 210 allow the top external support frames 206 and the lower external support frames 208 to be mechanically connected to the side internal frames 202. In the embodiment shown, the support frames 206, 208 are riveted to the connecting plates 210, but any suitable attachment may be used without departing from the invention.

Figure 10:
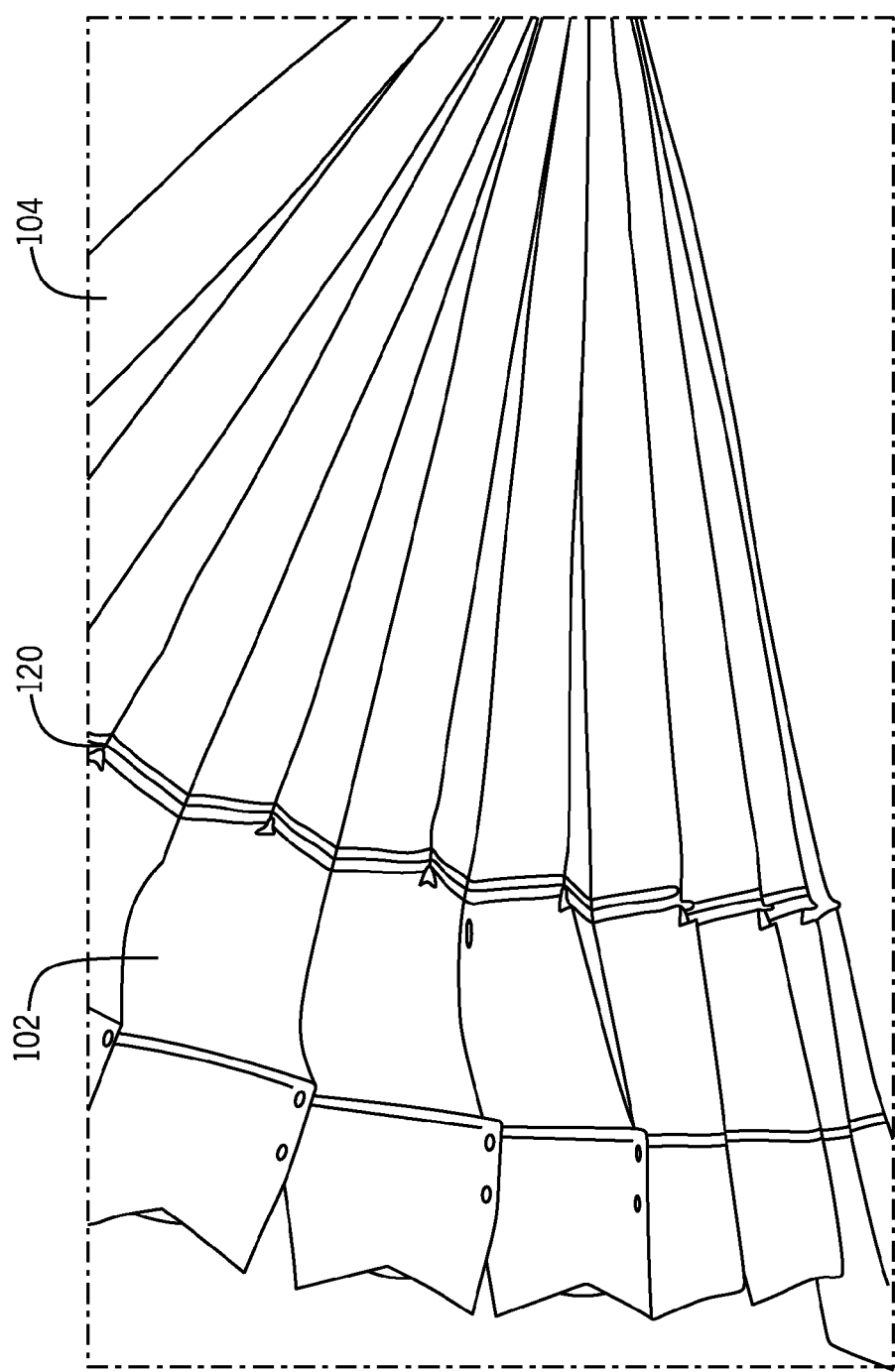
FIG. 10 is a detail perspective view of the bellows of FIG. 4 showing the pleated flexible pieces prior to mounting support frames.
Figure 11:
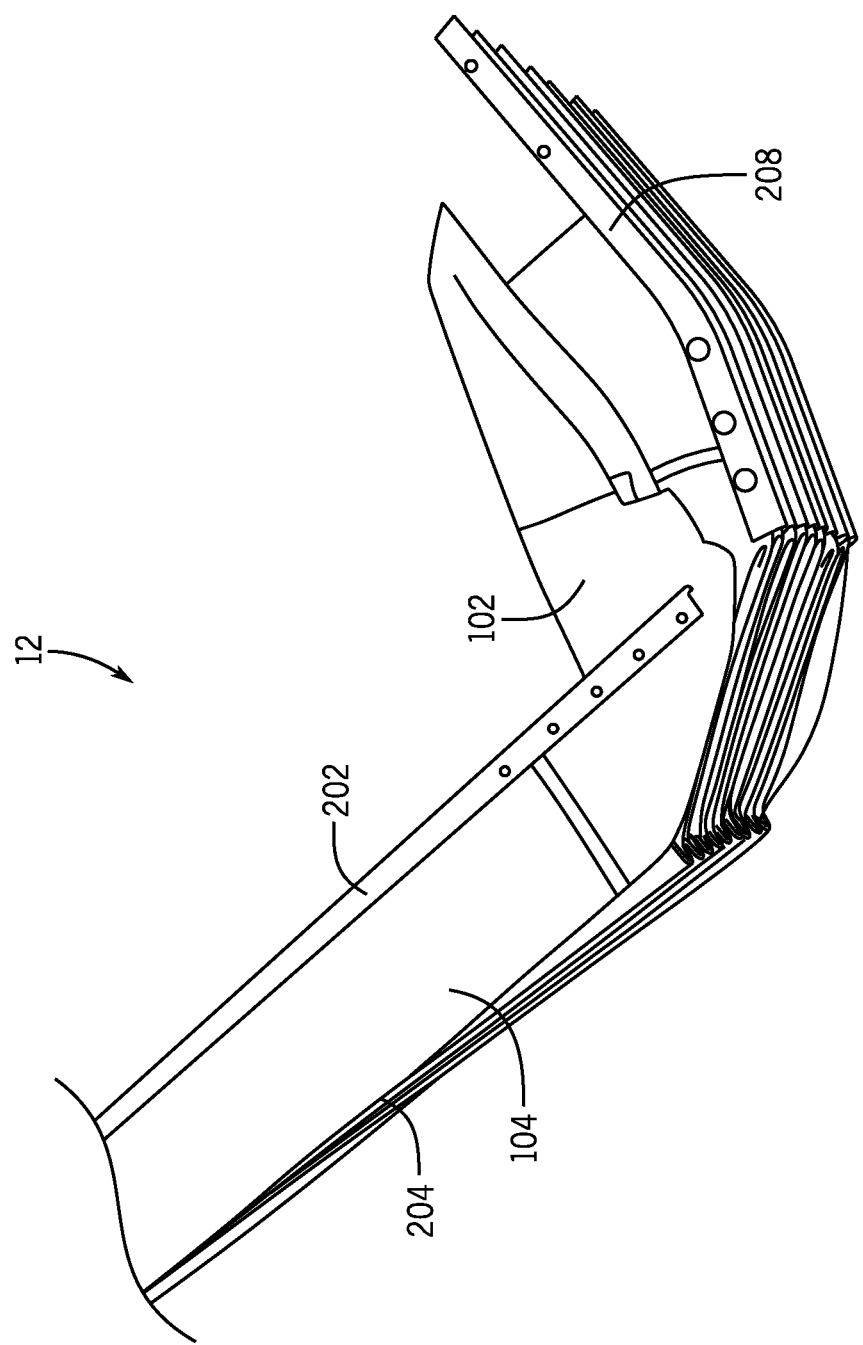
FIG. 11 is a detail perspective view of the bellows of FIG. 4 showing the side and lower folding parts of the flexible material with internal and external support frames.
Figure 12:
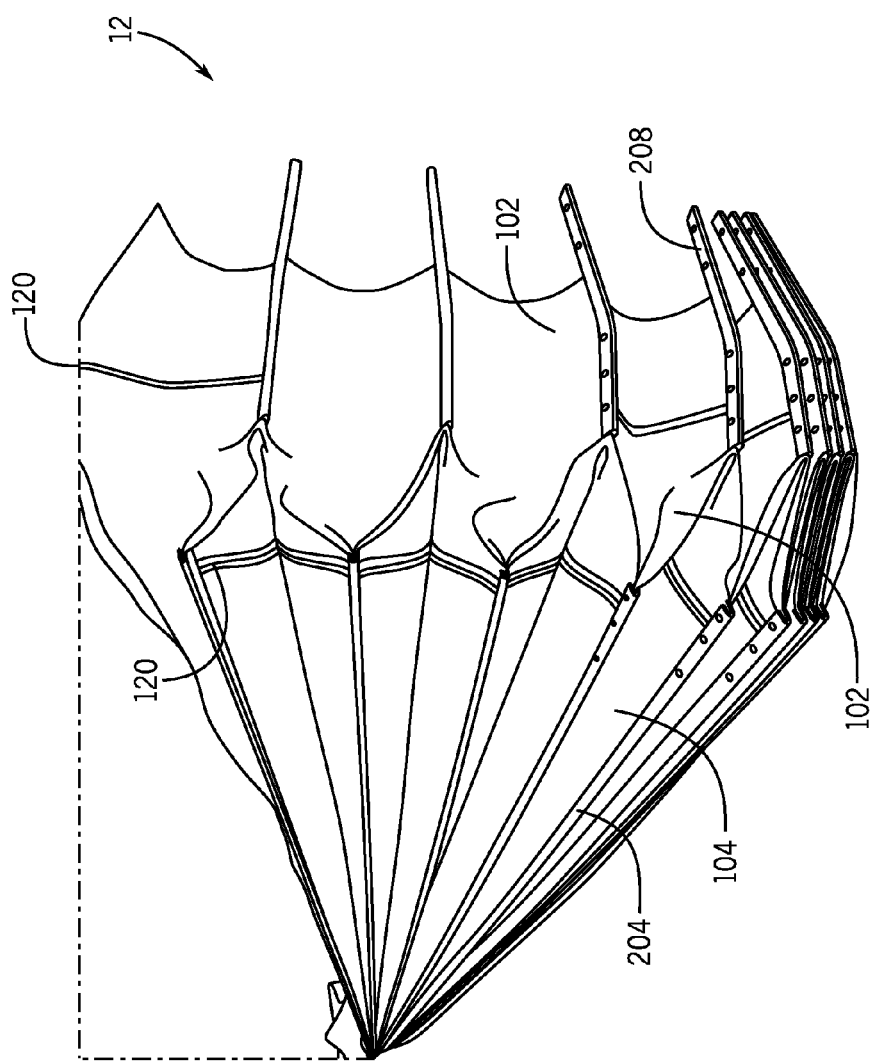
FIG. 12 is a detail perspective view of the bellows of FIG. 4 showing the side and lower portion of the bellows with connecting frames fastened in place and opened to show the folding corner.
Figure 18:
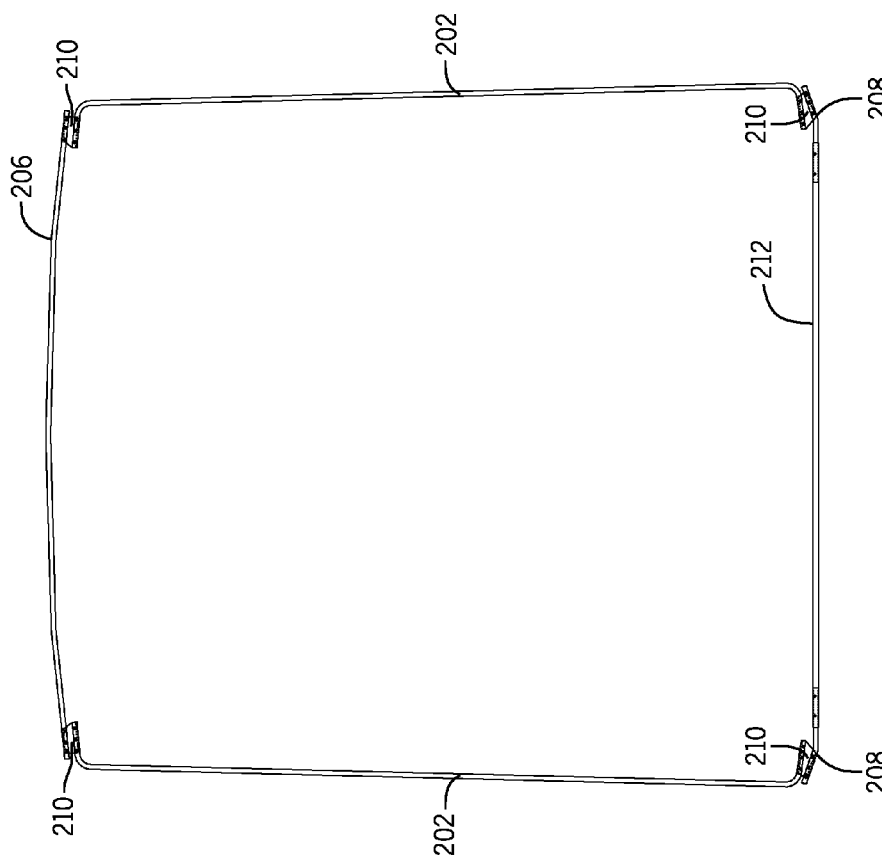
FIG. 18 is a detail schematic view the bellows of FIG. 4 showing an internal side support frame, connecting plates, and lower connecting channel forming a continuous hoop when assembled.

The chamfered corner arrangement shown in FIGS. 10-12, in which an outer fold on one side transitions to an inner fold on an adjacent side, and vice versa, allows for this to occur. Alternatively, the side external support frames 204 may be installed with a slight offset and the connecting plates 210 configured such that they attach to the offset and allow the side internal support frame 202 to connect to the top external support frame 206. Such a configuration negates the need to bend a radial arc into the support frame. As shown in FIG. 18, a lower connecting channel 212 will then mount to the lower external support frames 208 so that when completely assembled, a fully connected, solid support frame exists for each fold.

Figure 13:
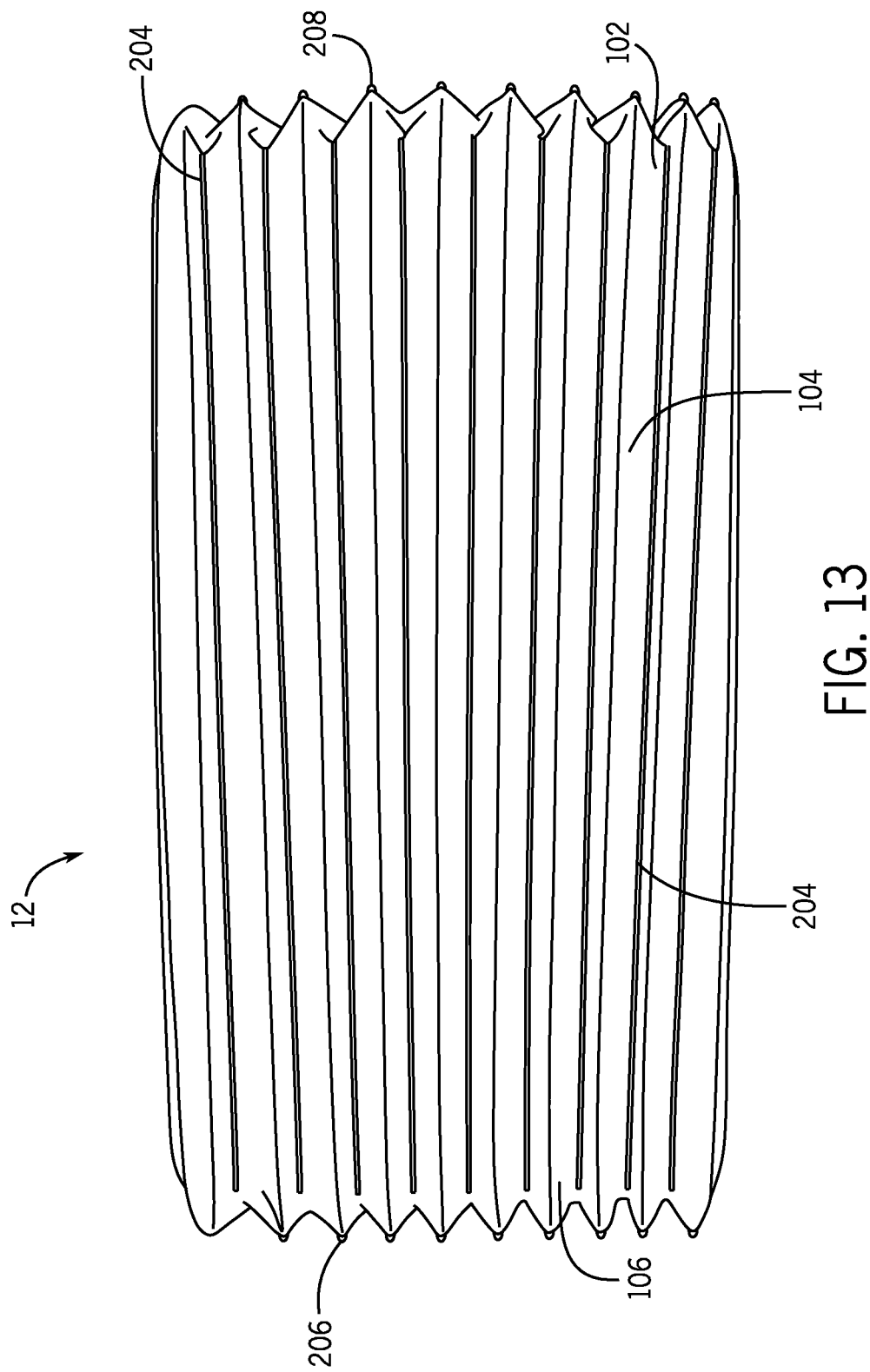
FIG. 13 is a detail perspective view of the bellows of FIG. 4 showing the external side support frames as well as the upper and lower folding corners.
Figure 14:
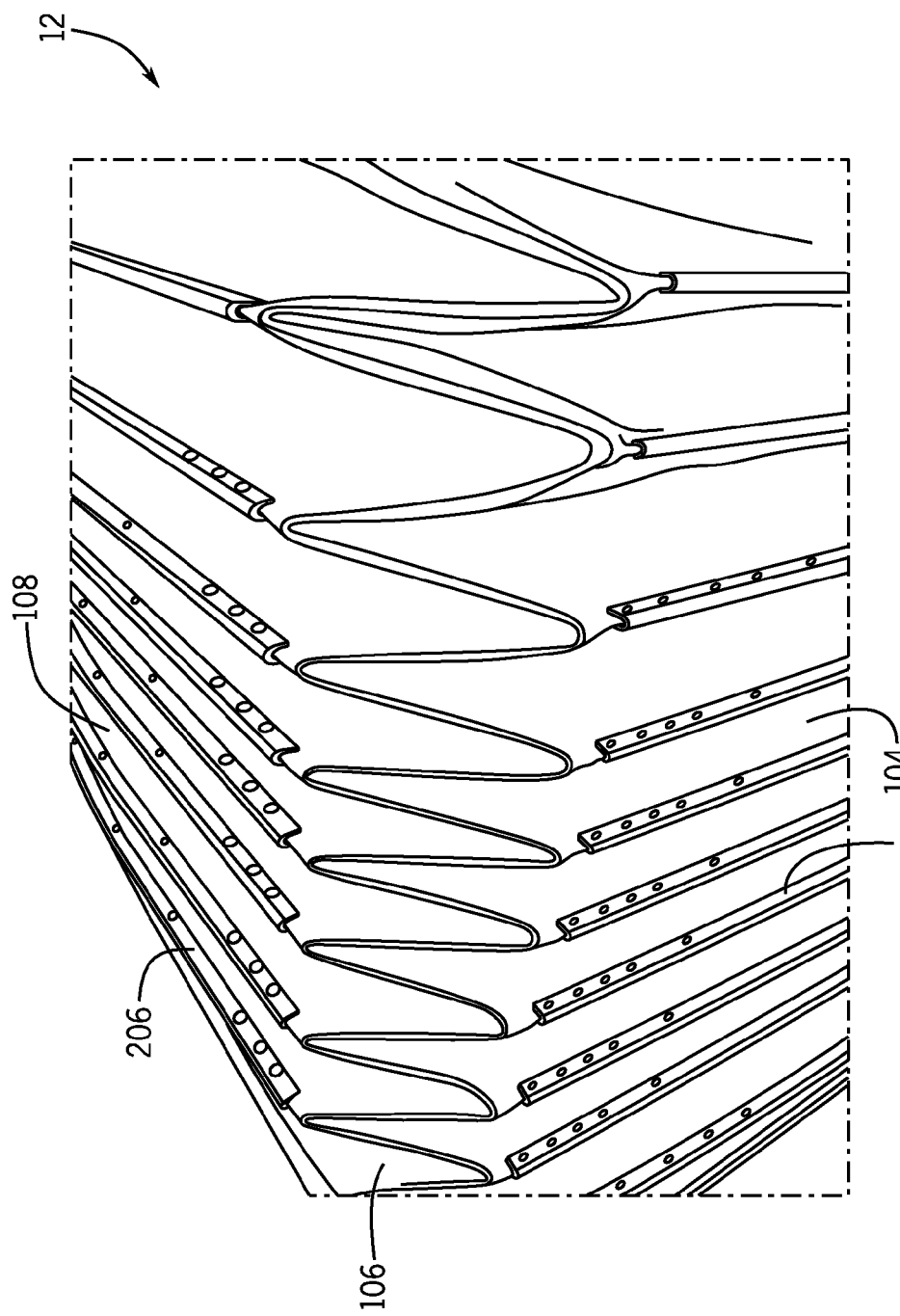
FIG. 14 is a detail perspective view of the bellows of FIG. 4 showing the external side support frames, the upper folding corner, and the top support frames.
Figure 15:
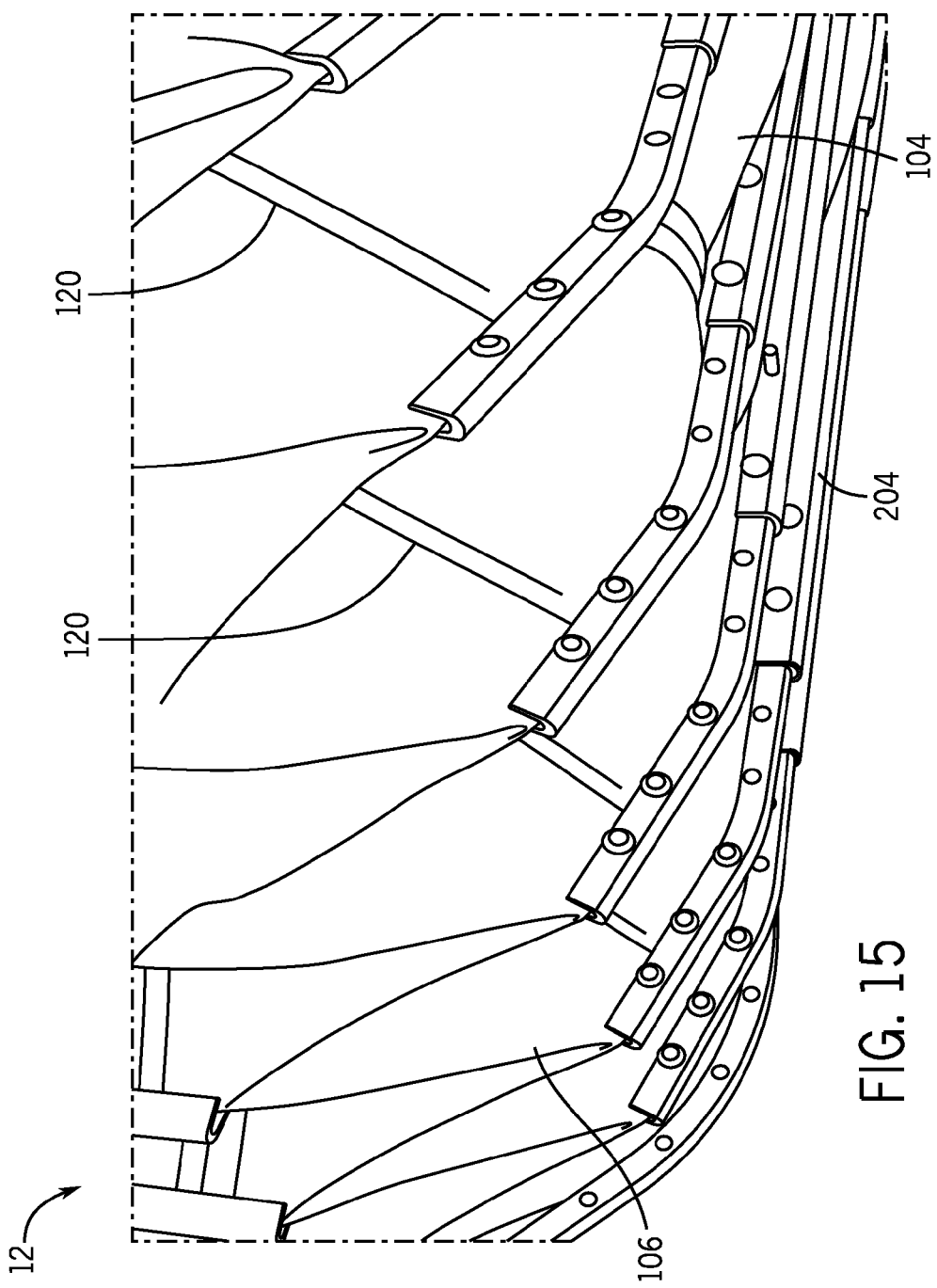
FIG. 15 is a detail perspective view of the bellows of FIG. 4 showing the lower support frames.
Figure 16:
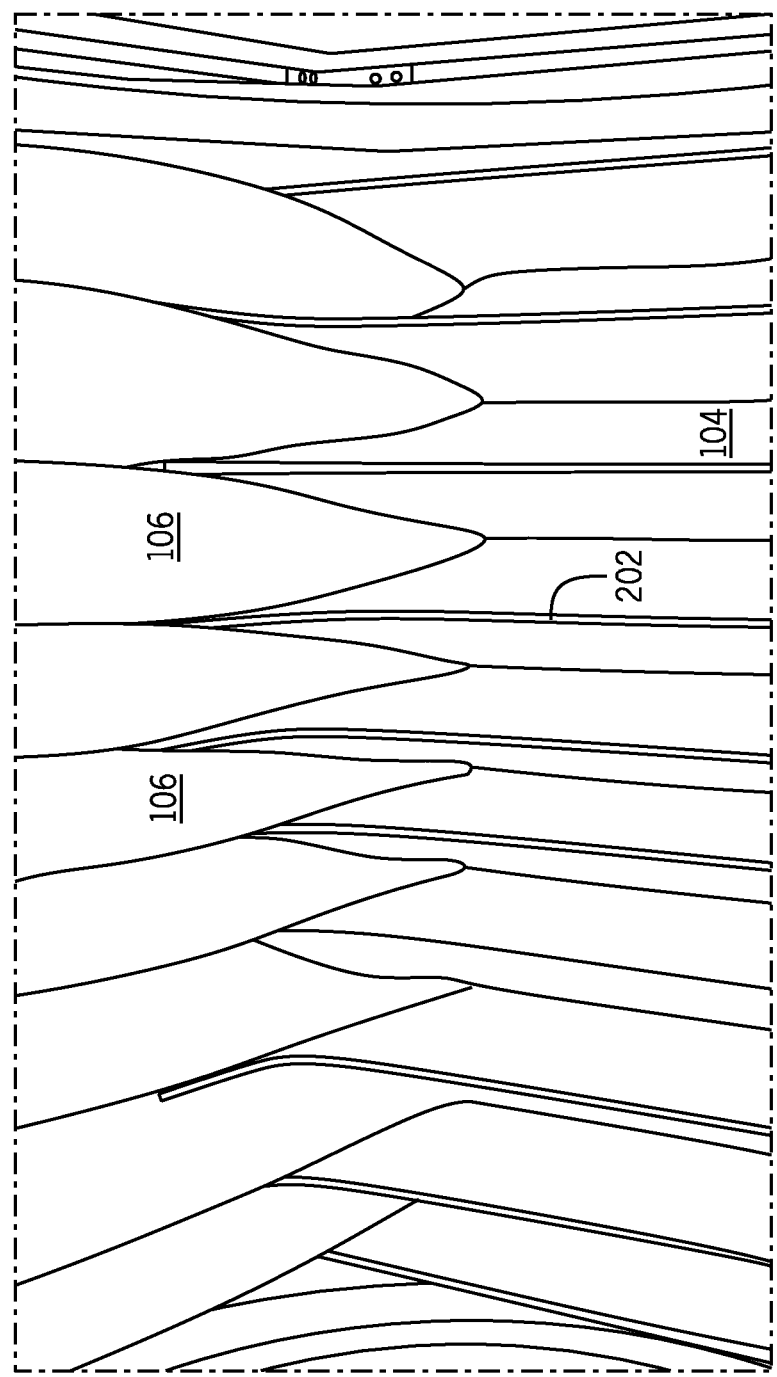
FIG. 16 is a detail perspective view of the bellows of FIG. 4 showing the internal side support frame.
Figure 17:
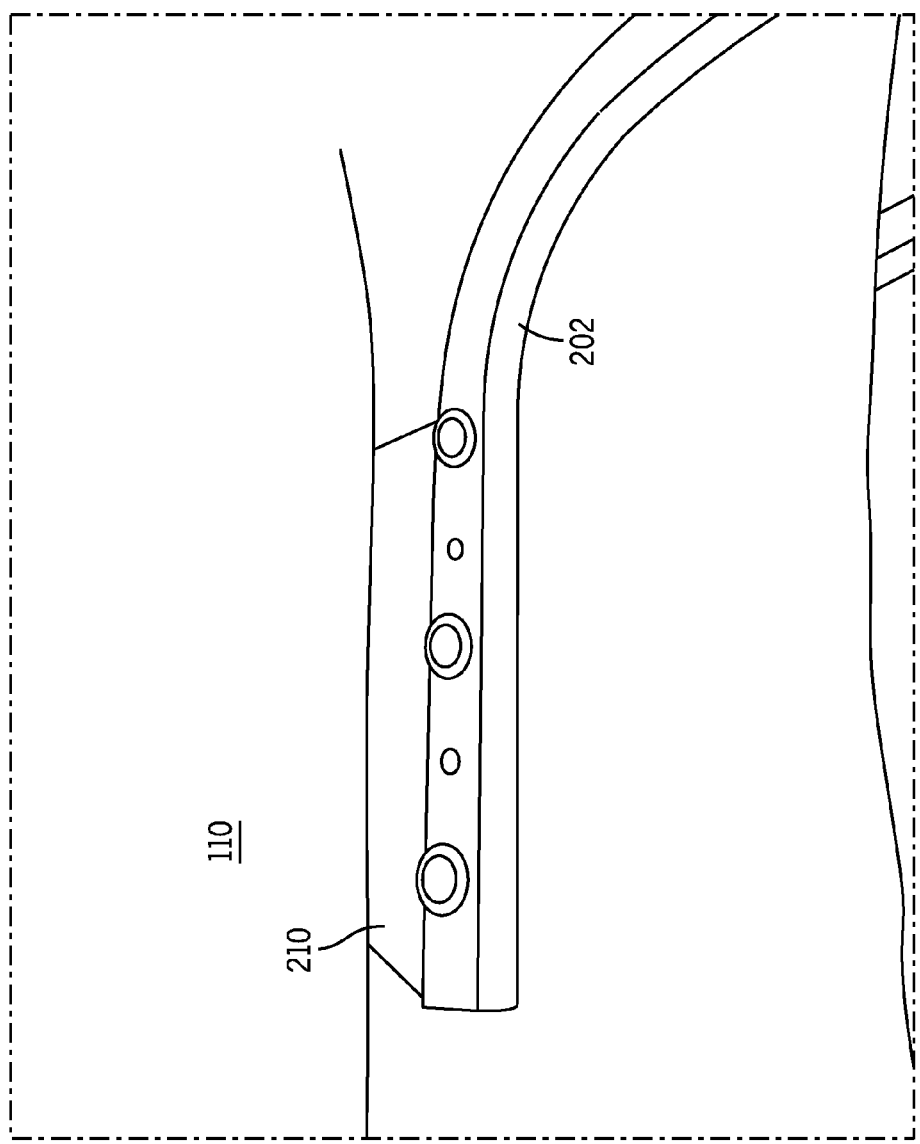
FIG. 17 is a detail perspective view of the bellows of FIG. 4 showing an internal side support frame and an upper connecting plate to which the external top support frame is attached.

FIGS. 13-18 are various detail views of a fully assembled bellows 12. FIG. 13 shows a fully assembled bellows 12, with the folds partially extended, showing the seamless folds formed between the side external support frames 204 and between the top and bottom external support frames 206, 208. FIG. 14 is a detail view showing the upper corner folds achieved in the present embodiment. FIG. 15 is a detail view showing the lower corner folds of the present embodiment. FIG. 16 shows the interior structure of the bellows 12 with the folds partially extended so that the side internal support frames 202 are visible. FIG. 17 is a detail view showing the connector plate 210 attached to the side internal support frame 202.

Although one embodiment is described in detail herein, alternative configurations of the support frame can that serve the same purpose do not depart from the invention. For example, a single lower external support frame can replace the two short lower external support frames 208 and connecting channel 212 to produce the same connected solid frame. Another example is that the connecting plates 210 can be assembled to the upper external support frames 206 rather than the side internal support frames 202. This embodiment would allow the straight pleated shape to be transported in a manageable configuration with all of the necessary frames attached and then simply formed and connected with internal fasteners for final assembly.

The movement of an articulated bus is a combination of an opening fan motion and a shearing motion. In a standard bellows configuration, the shearing motion results in a force that is great enough to form an S shape into the support frames. By creating a rolled shape with the flexible material, the shearing motion is taken up by the flexible material rather than the rigid support frames.

The assembly of the bellows 12 involves crimping, or staking, the support frames to the folded peaks of the flexible material 100 as defined by the slits 116 and cutouts in the flexible material after it has been folded into a pleated shape. In the embodiment described herein, the internal and external side support frames 202, 204 are connected to the fabric peaks first. Next, the lower fabric is folded and connected to the support frames by crimping the frame to the fabric and mechanically connecting the lower external support frame 208 to the connecting plate 210 by riveting, for example. Next, the upper corners are formed by crimping the top external support frame 206 onto the fabric, and connecting the top external support frame to the connecting plate 210. This process will be repeated for each folding section that is required. The last fold can be adapted to many different configurations as required by the end user.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A bellows for an articulating vehicle comprising:
   an assembled flexible material layout comprising:
   a left bottom corner flexible portion having an internal and an external side;
   a left side flexible portion having an internal and an external side;
   a left top corner flexible portion having an internal and an external side;
   a top flexible portion having an internal and an external side;
   a right top corner flexible portion having an internal and an external side;
   a right side flexible portion having an internal and an external side; and
   a right bottom corner flexible portion having an internal and an external side;

wherein the portions of the assembled flexible material layout are attached as follows:
one end of the left bottom corner flexible portion is attached to a first end of the left side flexible portion;
a second end of the left side flexible portion is attached to a first end of the left top corner flexible portion;
a second end of the left top corner flexible portion is attached to a first end of the top flexible portion;
a second end of the top flexible portion is attached to a first end of the right top corner flexible portion;
a second end of the right top corner portion is attached to a first end of the right side flexible portion;
a second end of the right side flexible portion is attached to a first end of the right bottom corner flexible portion; and
wherein a plurality of support frames are attached to the portions of the flexible material layout as follows:
a plurality of external side support frames are attached to the external sides of the right and left side flexible portions;
a plurality of internal side support frames having a top connecting plate and a bottom connecting plate are attached to the internal sides of the right and left side flexible portions;
a plurality of top support frames are attached to the external side of the top flexible portion and further attached to the top connecting plates; and
a plurality of bottom support frames are attached to the external sides of the left bottom corner and right bottom corner flexible portions and further attached to the bottom connecting plates.

2. The bellows of claim 1, wherein the external side support frames are attached to the right and left side flexible portions by crimping.

3. The bellows of claim 1, wherein the internal side support frames are attached to the right and left side flexible portions by crimping.

4. The bellows of claim 1, wherein top and bottom connecting plates are attached to the top and bottom support frames by rivets.

5. The bellows of claim 1, wherein the internal side support, external side support, top, and bottom support frames are crimped to alternating folds of the assembled flexible material layout.

6. The bellows of claim 1, wherein the assembled flexible material layout is made of fabric.

7. The bellows of claim 1, wherein the side flexible portions are made of plastic.

8. The bellows of claim 1, wherein the internal side support, external side support, top, and bottom support frames are made of aluminum.

9. The bellows of claim 1, wherein the flexible portions are sewn together.

10. A method of assembling a bellows for an articulating vehicle comprising the steps of;
cutting flexible material into a left bottom corner flexible portion having an internal and an external side, a left side flexible portion having an internal and an external side, a left top corner flexible portion having an internal and an external side, a top flexible portion having an internal and an external side, a right top corner flexible portion having an internal and an external side, a right side flexible portion having an internal and an external side, and a right bottom corner flexible portion having an internal and an external side;
assembling an assembled flexible material layout by attaching one end of the left bottom corner flexible portion to a first end of the left side flexible portion, attaching a second end of the left side flexible portion to a first end of the left top corner flexible portion, attaching a second end of the left top corner flexible portion to a first end of the top flexible portion, attaching a second end of the top flexible portion to a first end of the right top flexible portion, attaching a second end of the right top flexible portion to a first end of the right side flexible portion, and attaching a second end of the right side flexible portion to a first end of the right bottom corner flexible portion;
folding the assembled flexible material layout into a pleated shape having a plurality of internal and external pleats;
attaching a plurality of external side support frames to the external pleats;
attaching a plurality of internal side support frames including top and bottom connecting plates to the internal pleats;
attaching a plurality of lower external support frames to the external side of the left and right bottom corner flexible portions;
attaching the lower external support frames to the bottom connecting plates;
attaching a plurality of top external support frames to the external side of the top flexible portion; and
attaching the top external support frames to the top connecting plates.

* * * * *